(12) United States Patent
Rau (10) Patent No.: US 10,921,038 B2
(45) Date of Patent: Feb. 16, 2021

(54) ACCESS PANEL (71) Applicant: Carrier Corporation, Jupiter, FL (US)

(72) Inventor: Mark P. Rau, Fairport, NY (US)

(73) Assignee: Carrier Corporation, Palm Beach Gardens, FL (US)

( * ) Notice: Subject to any disclaimer, the term of this patent is extended or adjusted under 35 U.S.C. 154(b) by 419 days.

(21) Appl. No.: 15/538,046

(22) PCT Filed: Dec. 10, 2015

(86) PCT No.: PCT/US2015/064932
§ 371 (c)(1),
(2) Date: Jun. 20, 2017

(87) PCT Pub. No.: WO2016/109145
PCT Pub. Date: Jul. 7, 2016

(65) Prior Publication Data
US 2019/0041115 A1 Feb. 7, 2019

Related U.S. Application Data (60) Provisional application No. 62/098,144, filed on Dec. 30, 2014.

(51) Int. Cl.
*F25D 11/00* (2006.01)
*B65D 88/74* (2006.01)
(Continued)

(52) U.S. Cl.
CPC .......... *F25D 11/003* (2013.01); *B65D 88/745* (2013.01); *F24F 13/10* (2013.01);
(Continued)

(58) Field of Classification Search
CPC .... F25D 11/003; F25D 17/06; F25D 2400/12; F24F 13/10; F24F 13/12; F24F 13/28; B60H 1/00014; B60H 1/26; B65D 88/745
See application file for complete search history.

(56) References Cited

U.S. PATENT DOCUMENTS 3,932,157 A * 1/1976 Bolton ................... F24F 13/10
62/408
4,172,918 A 10/1979 Doerer
(Continued)

FOREIGN PATENT DOCUMENTS

CN 1871480 A 11/2006
CN 101400490 A 4/2009
(Continued)

OTHER PUBLICATIONS

International Search Report and Written Opinion dated Aug. 30, 2016 for PCT Patent Application No. PCT/US15/64932.
(Continued)

*Primary Examiner* — Filip Zec
(74) *Attorney, Agent, or Firm* — Bachman & LaPointe, P.C.

(57) ABSTRACT

A system comprises: a molded tub (92A; 92B) comprising: a base (96); a sidewall (98) extending from the base; and a mounting flange (94) extending from the sidewall; a premolded expanded material insert (162, 164; 220, 222; 700, 702) within the tub; and a cover (90A; 90B) over the insert.

20 Claims, 10 Drawing Sheets (51) Int. Cl.
*F24F 13/12* (2006.01)
*F24F 13/10* (2006.01)
*F25D 17/06* (2006.01)
*F24F 13/28* (2006.01)

(52) U.S. Cl.
CPC .............. *F24F 13/12* (2013.01); *F25D 17/06* (2013.01); *F24F 13/28* (2013.01); *F25D 2400/12* (2013.01)

(56) References Cited

U.S. PATENT DOCUMENTS

| | | | |
|---|---|---|---|
| 4,407,187 A * | 10/1983 | Horney | F24F 13/12 454/324 |
| 5,472,380 A * | 12/1995 | Sarazen, Jr. | F24F 13/075 454/290 |
| 5,564,976 A | 10/1996 | Müller et al. | |
| 5,851,143 A | 12/1998 | Hamid | |
| 6,162,272 A * | 12/2000 | Michaelis | B01D 46/0001 55/497 |
| 6,227,962 B1 * | 5/2001 | Orendorff | F24F 13/082 454/289 |
| 6,468,148 B1 | 10/2002 | Furusawa et al. | |
| 6,499,947 B2 | 12/2002 | Olthof | |
| 6,684,943 B2 | 2/2004 | Dobbs et al. | |
| 6,763,677 B1 | 7/2004 | Burchill et al. | |
| 8,186,468 B2 | 5/2012 | Parrett et al. | |
| 2003/0014982 A1 * | 1/2003 | Smith | C09K 5/047 62/106 |
| 2005/0208888 A1 * | 9/2005 | Moore | F24F 13/12 454/334 |
| 2005/0241326 A1 | 11/2005 | Yoong et al. | |
| 2007/0119187 A1 * | 5/2007 | Kitchens | F25B 21/02 62/3.6 |
| 2008/0314072 A1 | 12/2008 | Plank et al. | |
| 2012/0018026 A1 | 1/2012 | Hazen et al. | |
| 2014/0338390 A1 * | 11/2014 | Pinto | F25D 11/003 62/441 |

FOREIGN PATENT DOCUMENTS

| | | |
|---|---|---|
| CN | 202558052 U | 11/2012 |
| CN | 103427239 A | 12/2013 |
| DE | 202005011482 U1 | 11/2005 |
| DE | 102007057281 A1 | 6/2009 |
| DE | 102009056968 B3 | 3/2011 |
| NL | 1016525 C2 | 5/2001 |
| WO | 2014/151706 A1 | 9/2014 |

OTHER PUBLICATIONS

Chinese Office Action dated Jul. 3, 2019 for Chinese Patent Application No. 201580072041.4.
Chinese Office Action dated Apr. 8, 2020 for Chinese Patent Application No. 201580072041.4.

* cited by examiner

ACCESS PANEL

CROSS-REFERENCE TO RELATED APPLICATION

Benefit is claimed of U.S. Patent Application No. 62/098,144, filed Dec. 30, 2014, and entitled "Access Panel", the disclosure of which is incorporated by reference herein in its entirety as if set forth at length.

BACKGROUND

The disclosure relates to refrigerated intermodal containers. More particularly, the disclosure relates to insulated fan access panels for refrigerated intermodal container equipment modules.

An exemplary refrigerated intermodal container has an equipment module at one end of the container. The equipment module contains a vapor compression system having a compressor, a heat rejection heat exchanger downstream of the compressor along a refrigerant flow path, an expansion device, and a heat absorption heat exchanger. One or more first fans may drive an external airflow across the heat rejection heat exchanger. One or more second fans may drive an internal airflow across the heat absorption heat exchanger. In various implementations, for powering the container, there may be a power cord for connecting to an external power source. For ease of manufacture or service, the equipment module may be pre-formed as a module mateable to a remainder of the container body (e.g., insertable into an open front end of the body).

The compartment may be provided with vents to vent gases from the interior. Certain gases that accumulate in the container may contribute to spoiling of produce. One example of venting involves an access panel adjacent one of the second fans. The access panel has a rotary gate. The rotary gate has an open condition wherein a first port upstream of the fan and a second port downstream of the fan are open to external atmosphere. This provides an outlet of gas from the container interior and an intake of fresh air.

The access panel may be removable for servicing the adjacent fan. In an exemplary system having two fans, an access panel adjacent one of the fans may lack a gate valve.

The access panels may be formed by assembling components and injecting a foam insulation. One example of such a container refrigeration system is sold by Carrier Corporation of Farmington, Conn. under the trademark ThinLINE.

SUMMARY

One aspect of the disclosure involves a system comprising a molded tub. The tub comprises: a base; a sidewall extending from the base; and a mounting flange extending from the sidewall. A pre-molded expanded material insert is within the tub. A cover is over the insert.

In one or more embodiments of any of the foregoing embodiments, the system forms a vent assembly wherein: the molded tub has a first port and a second port; the insert has a first passageway in communication with the tub first port and a second passageway in communication with the second port; and the system further comprises a rotary gate. The rotary gate is mounted to rotate around a gate axis between: a closed condition blocking flow through the first passageway and the second passageway; and an open condition allowing flow through the first passageway and the second passageway.

In one or more embodiments of any of the foregoing embodiments, the first port is an upper port and the second port is a lower port.

In one or more embodiments of any of the foregoing embodiments, a gasket is along a rear face of the base of the tub between the first port and the second port.

In one or more embodiments of any of the foregoing embodiments, the insert is a first insert and the system further comprises a second pre-molded expanded material insert in the tub and having a first passageway in communication with the tub first port so that a first combined passageway passes sequentially through the second insert, first insert, and tub and a second passageway in communication with the second port so that a second combined passageway passes sequentially through the second insert, first insert, and tub.

In one or more embodiments of any of the foregoing embodiments, a first screen is sandwiched between the first insert and the second insert along the first combined passageway and a second screen sandwiched between the first insert and the second insert along the second combined passageway.

In one or more embodiments of any of the foregoing embodiments, expanded material surfaces of the first insert and second insert form surfaces of the first combined passageway and expanded material surfaces of the first insert and second insert form surfaces of the second combined passageway.

In one or more embodiments of any of the foregoing embodiments, the system further comprises: a container body; a compartment of the container; and a refrigeration system. The refrigeration system comprises: a compressor; a first heat exchanger; an expansion device; a second heat exchanger; and a refrigerant flowpath proceeding sequentially through the compressor, first heat exchanger, expansion device, and second heat exchanger to return to the first heat exchanger; a fan positioned to drive an airflow along an air flowpath from the compartment, across the second heat exchanger and returning to the compartment.

In one or more embodiments of any of the foregoing embodiments, the container is an intermodal container and the refrigeration system is mounted at a first end of the container.

In one or more embodiments of any of the foregoing embodiments, the refrigeration system is a removeable module.

In one or more embodiments of any of the foregoing embodiments, the pre-molded expanded material insert comprises expanded bead material.

In one or more embodiments of any of the foregoing embodiments, the expanded bead material is expanded polypropylene.

In one or more embodiments of any of the foregoing embodiments, a method for manufacturing the system comprises inserting the pre-molded expanded material insert to the tub and securing the cover over the insert.

In one or more embodiments of any of the foregoing embodiments, the method further comprises securing a rotary gate to the cover.

In one or more embodiments of any of the foregoing embodiments, the inserting comprises: first inserting the pre-molded expanded polypropylene insert; and second inserting a second pre-molded expanded polypropylene insert.

In one or more embodiments of any of the foregoing embodiments, a combination of the insert and the second insert further comprises: a first passageway through the insert and second insert; a second passageway through the insert and second insert; a first screen along the first passageway; and a second screen along the second passageway.

In one or more embodiments of any of the foregoing embodiments, the method further comprises securing the insert to the second insert after the inserting of the insert.

Another aspect of the disclosure involves an access panel comprising: an expanded bead material member and a cover over the member.

In one or more embodiments of any of the foregoing embodiments, the access panel forms a vent assembly. The member has a first passageway and a second passageway.

The access panel further comprises a rotary gate mounted to rotate around a gate axis between: a closed condition blocking flow through the first passageway and the second passageway; and an open condition allowing flow through the first passageway and the second passageway.

In one or more embodiments of any of the foregoing embodiments, the member has a skin formed by melting of the expanded bead material.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
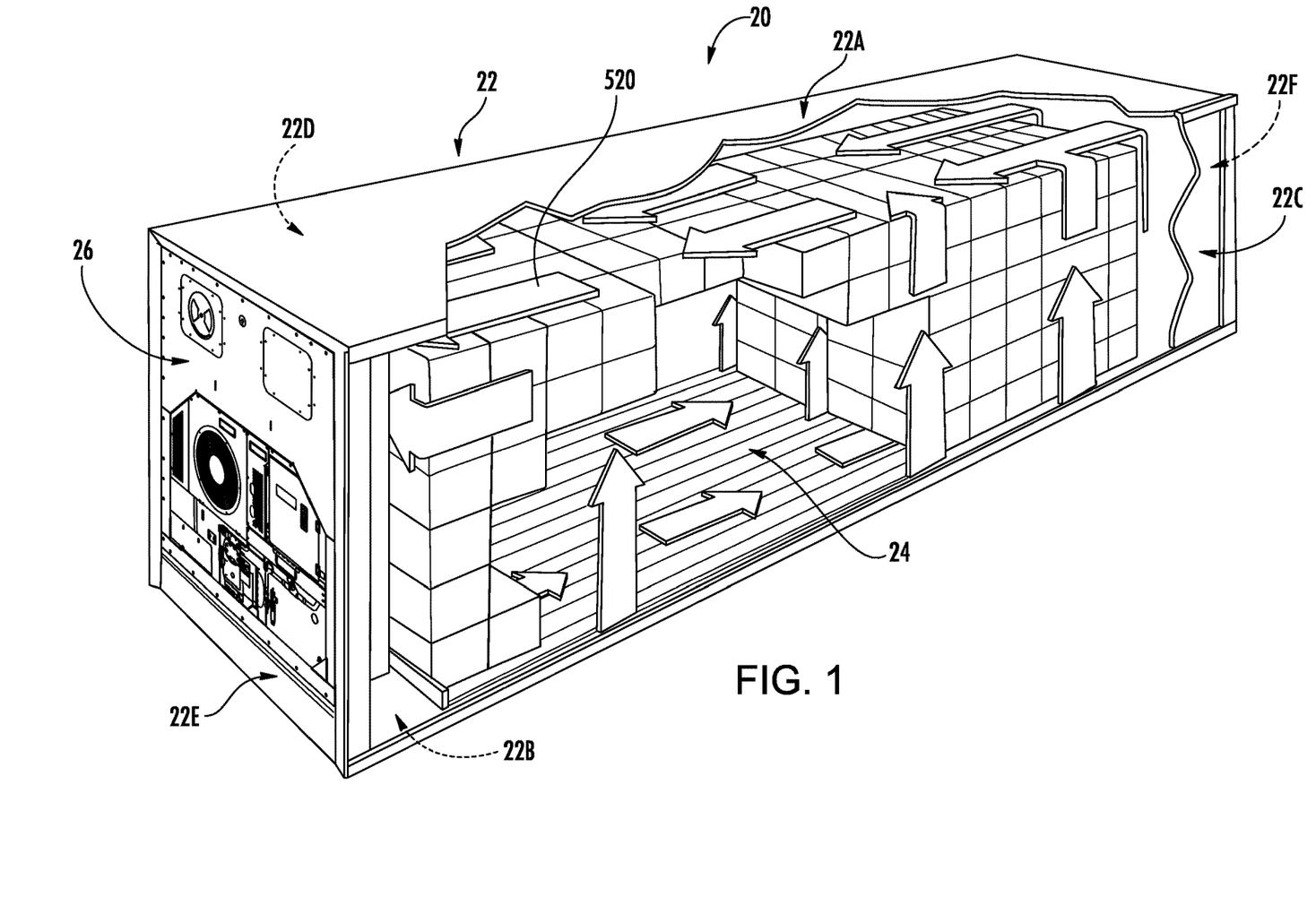
FIG. 1 is a cutaway view of a refrigerated cargo container.

FIG. 1 shows an intermodal container 20 that may be shipped, trucked, trained or the like. The container has a body 22 enclosing an interior 24. The body and interior are formed essentially as right parallelepipeds. The body has a top 22A, a bottom 22B, a first side 22C, a second side 22D, a first end 22E and a second end 22F. The top, bottom, and sides may be an integral rigid metallic structural system. The first end may be formed, in part, by an equipment module 26. The second end may essentially be formed by a pair of oppositely hinged doors.

Figure 3:
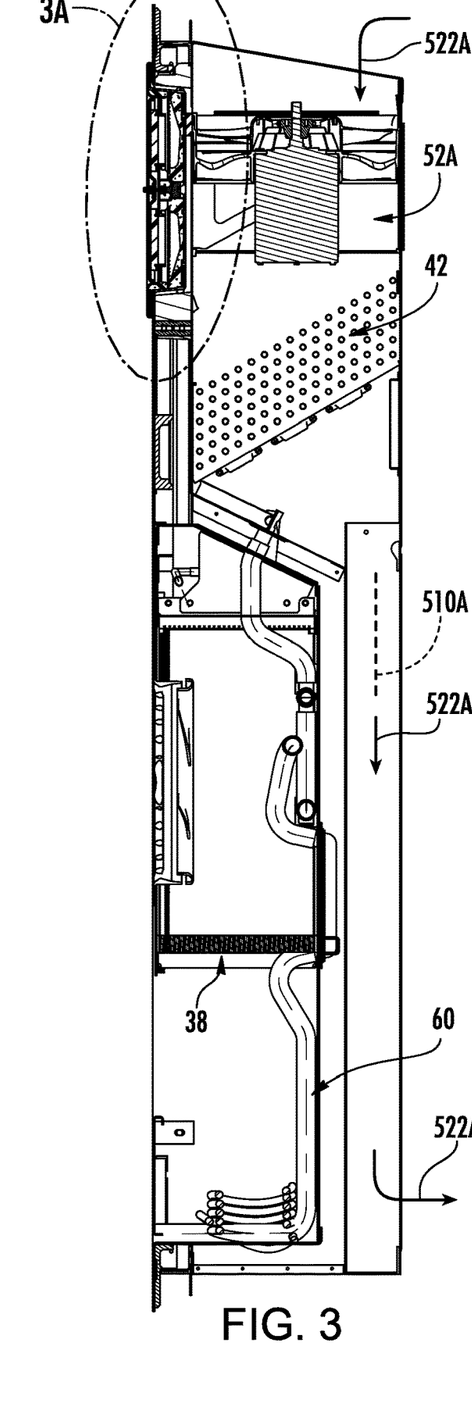
FIG. 3 is a longitudinal vertical sectional view of the module of FIG. 2, taken along line 3-3.
Figure 4:
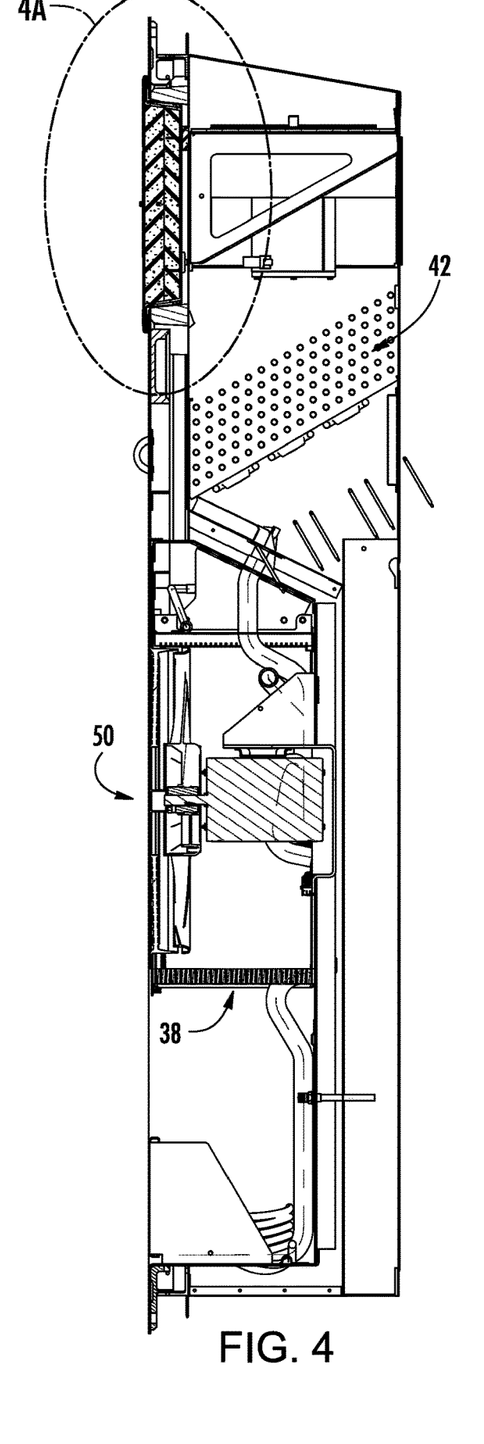
FIG. 4 is a longitudinal vertical sectional view of the module of FIG. 2, taken along line 4-4.
Figure 4A:
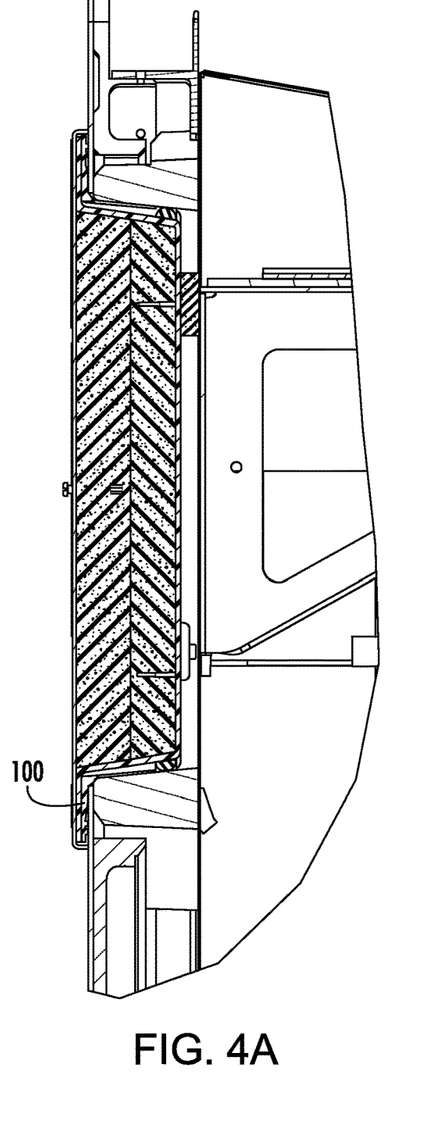
FIG. 4A is an enlarged view of an upper portion of the module of FIG. 4.
Figure 5:
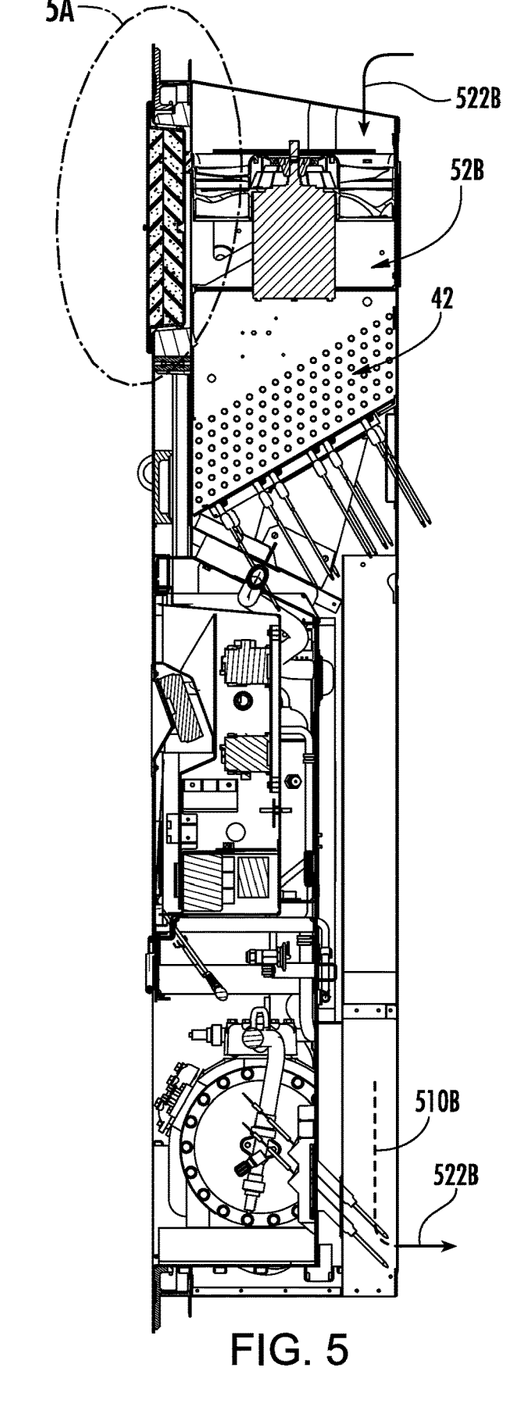
FIG. 5 is a longitudinal vertical sectional view of the module of FIG. 2, taken along line 5-5.

The equipment module contains a vapor compression refrigeration system 30 (FIG. 2) comprising, sequentially along a refrigerant flowpath 34, a compressor 36, a heat rejection heat exchanger 38 (FIG. 4), an expansion device 40, and a heat absorption heat exchanger 42. One or more first fans 50 may drive an external airflow 520 across the heat rejection heat exchanger. One or more second fans 52A, 52B (FIGS. 3 and 5) may drive an internal airflow 522A, 522B along respective flowpaths 510A, 510B across the heat absorption heat exchanger.

In various implementations, for powering the container, there may be a power cord 60 for connecting to an external power source. Additionally, the container may include a generator. For ease of manufacture or service, the equipment module may be pre-formed as a module mateable to a remainder of the container body (e.g., insertable into an open front end of the body).

Figure 2:
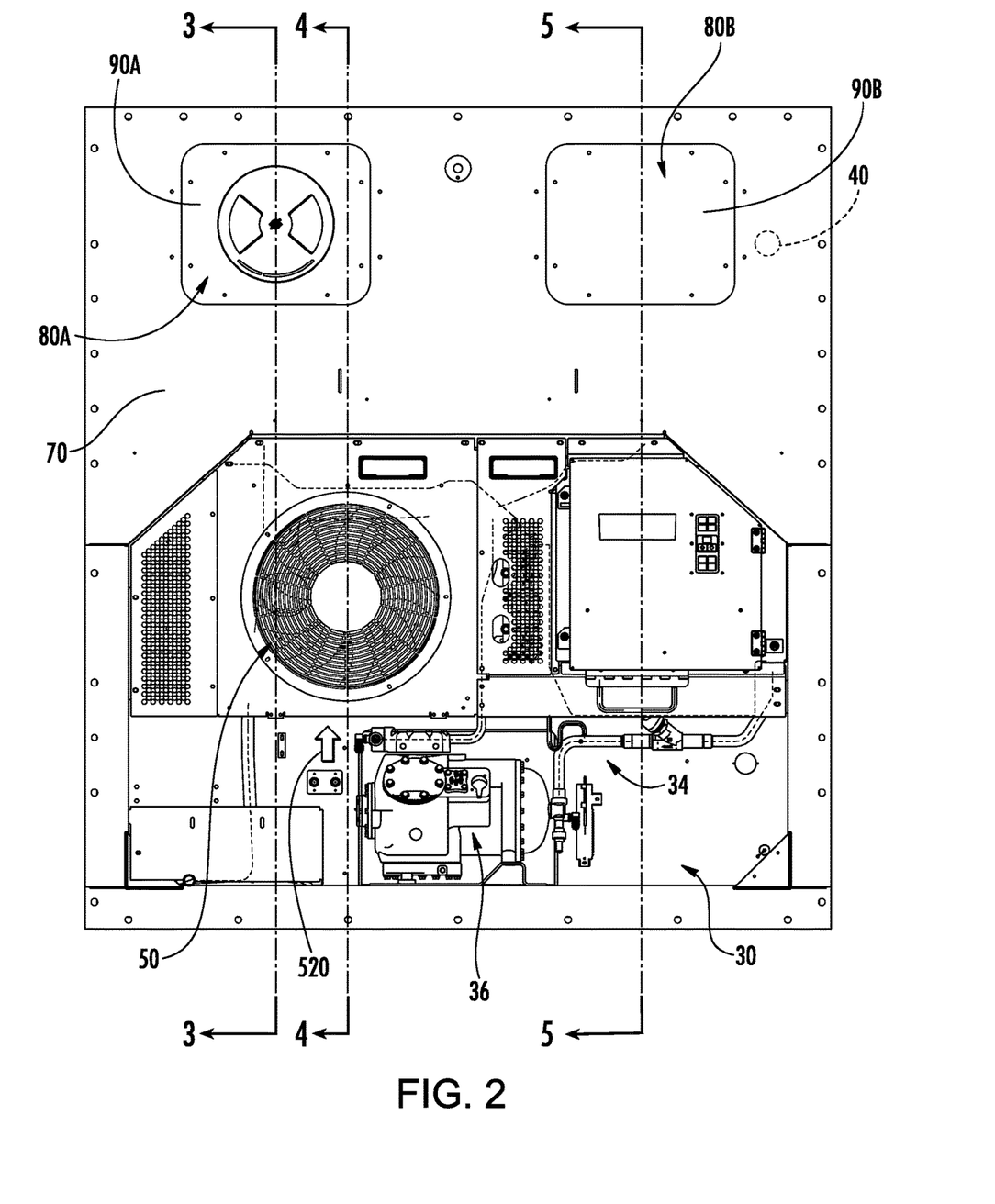
FIG. 2 is a front view of a refrigeration unit of the container of FIG. 1.
Figure 3A:
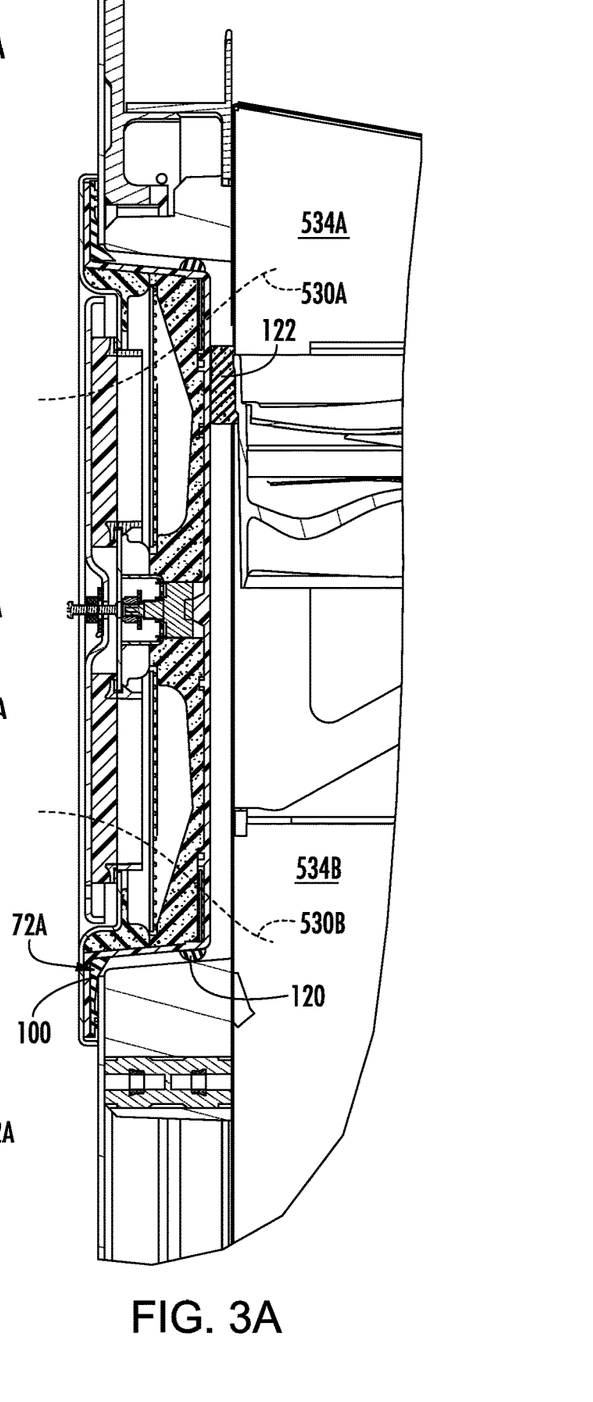
FIG. 3A is an enlarged view of an upper portion of the module of FIG. 3.
Figure 5A:
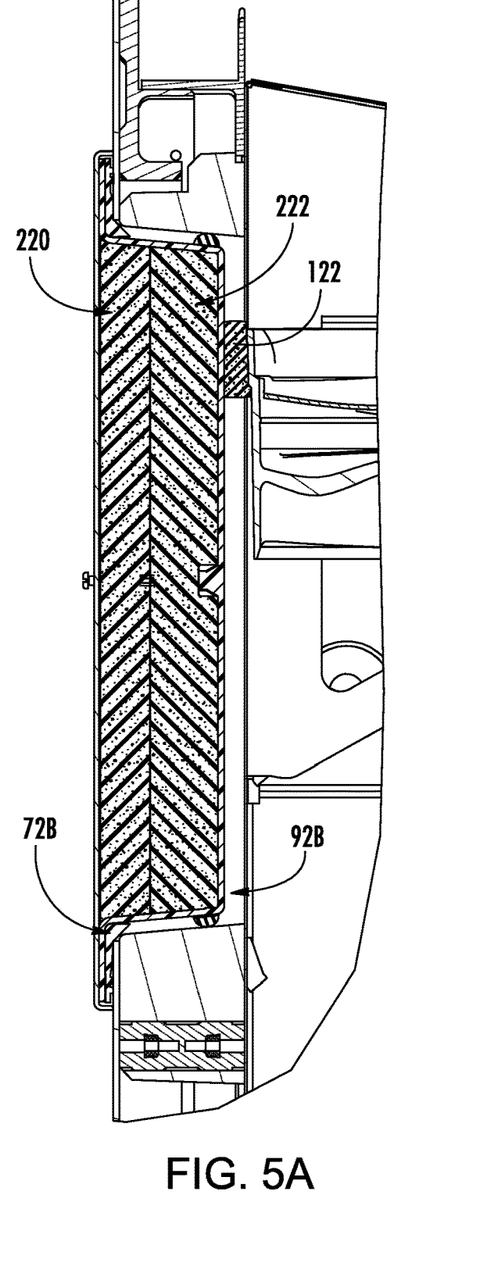
FIG. 5A is an enlarged view of an upper portion of the module of FIG. 5.

The module 26 comprises a front panel 70 (FIG. 2). The panel 70 may have a plurality of openings of which some may be closed by various means. Two of the openings 72A, 72B (FIGS. 3A and 5A) are along the respective air flowpaths 510A, 510B of the two evaporator fans. These flowpaths may be isolated from each other or may merely be adjacent halves of a single flowpath (or may be a combination, separating and merging). In this example, the opening spans the fan, so that a portion of the opening is upstream of the fan and a portion of the opening is downstream. The openings 72A, 72B are closed by respective access panels 80A, 80B (FIG. 2). The exemplary panel 80A includes a rotary gate valve for venting. Other valve/gate structures may be provided. The exemplary panel 80B lacks any vent/valve.

As so far described, the module 26 may reflect the aforementioned ThinLINE module. A baseline ThinLINE module may have access panels formed by assembling mechanical components and then injecting foam insulation into the access panel. The panels 80A, 80B replace the in situ insulation foaming with pre-formed insulative inserts.

Figure 6:
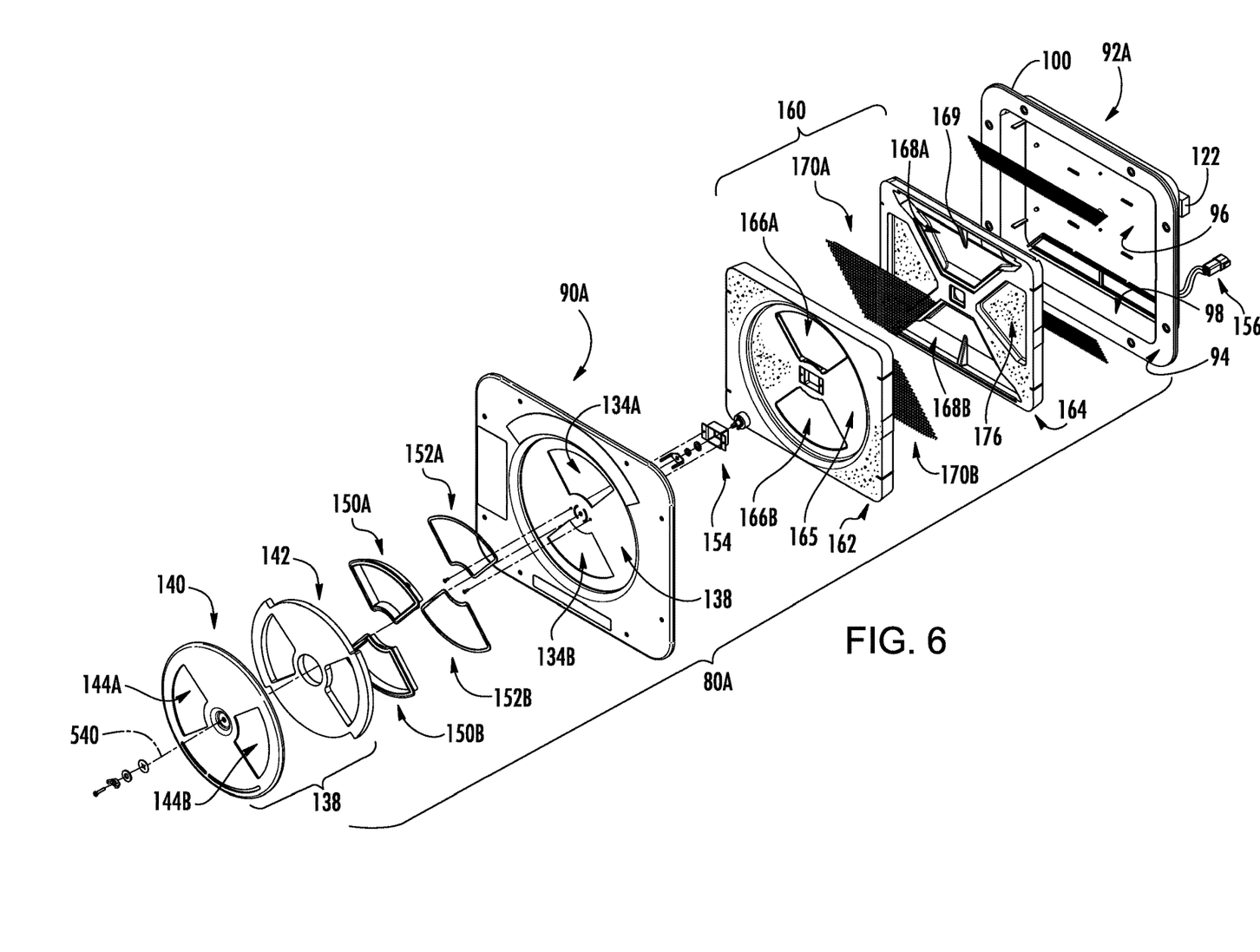
FIG. 6 is a front exploded view of a vented access panel of the module of FIG. 2.
Figure 8:
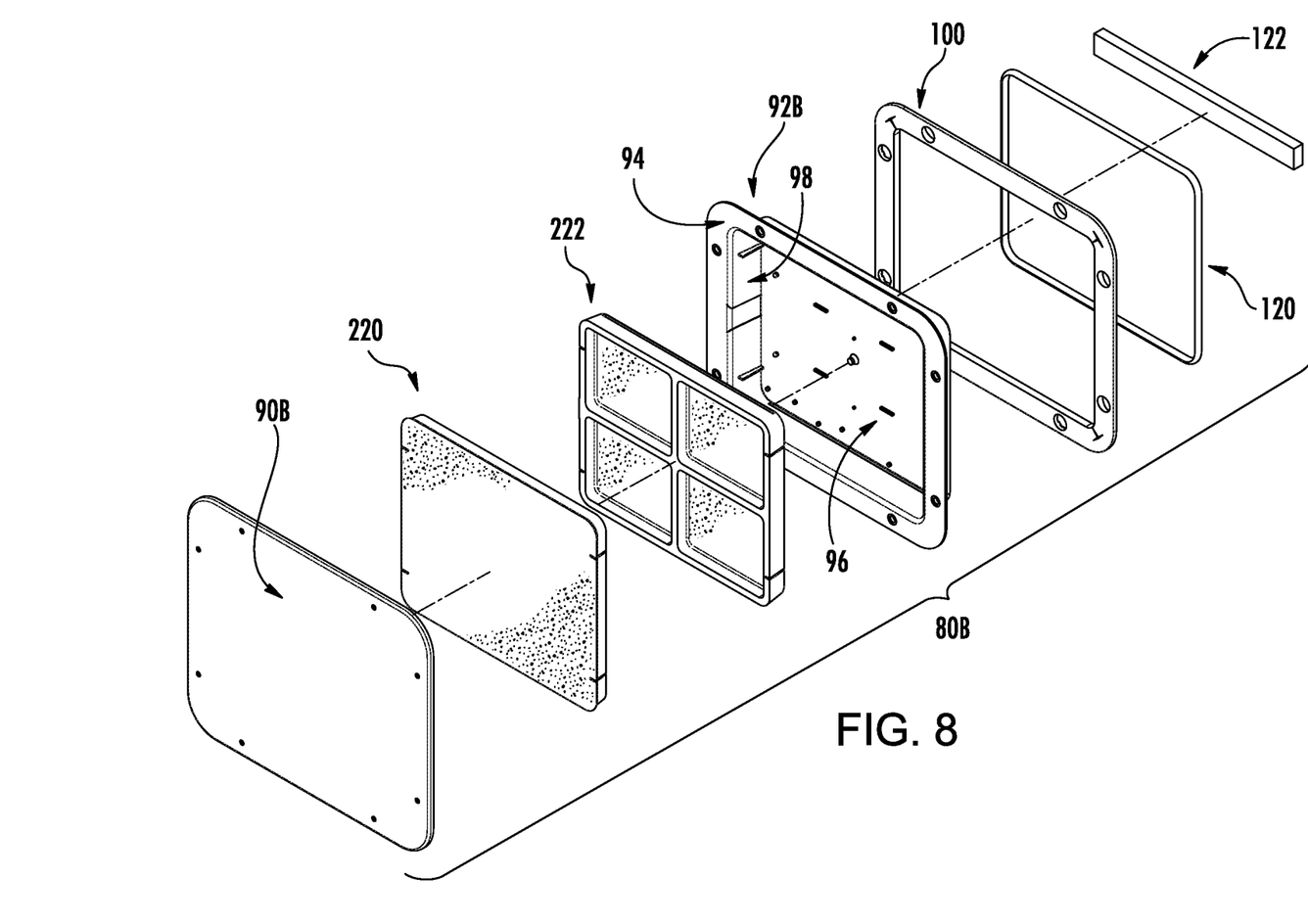
FIG. 8 is a front exploded view of a non-vented access panel of the module of FIG. 2.

Each access panel 80A, 80B may be an assembly of multiple pieces including a faceplate 90A, 90B and a tub or body (e.g., of molded plastic such as ABS) 92A, 92B (FIGS. 6 and 8). Each of the bodies 92A, 92B is of generally rectangular planform (e.g., a rectangle with rounded corners) having a perimeter mounting flange 94, a rear wall or base 96, and a sidewall 98 extending forward from the base joining the flange at the inner perimeter of the flange.

The flange 94 has a perimeter array of mounting holes for receiving fasteners (e.g., screws).

Each exemplary panel further comprises a flange gasket 100 for sealing between the aft face of the flange 94 and the forward face of the panel 70. Each exemplary access panel further includes a ring gasket 120 (FIG. 8; e.g., an elastomeric half-round O-ring) for radially sealing between the outboard face of the sidewall 98 and adjacent structure of the opening 72A or 72B. A further gasket 122 may be provided for sealing against a forward wall of a fan duct as is discussed below.

Figure 7:
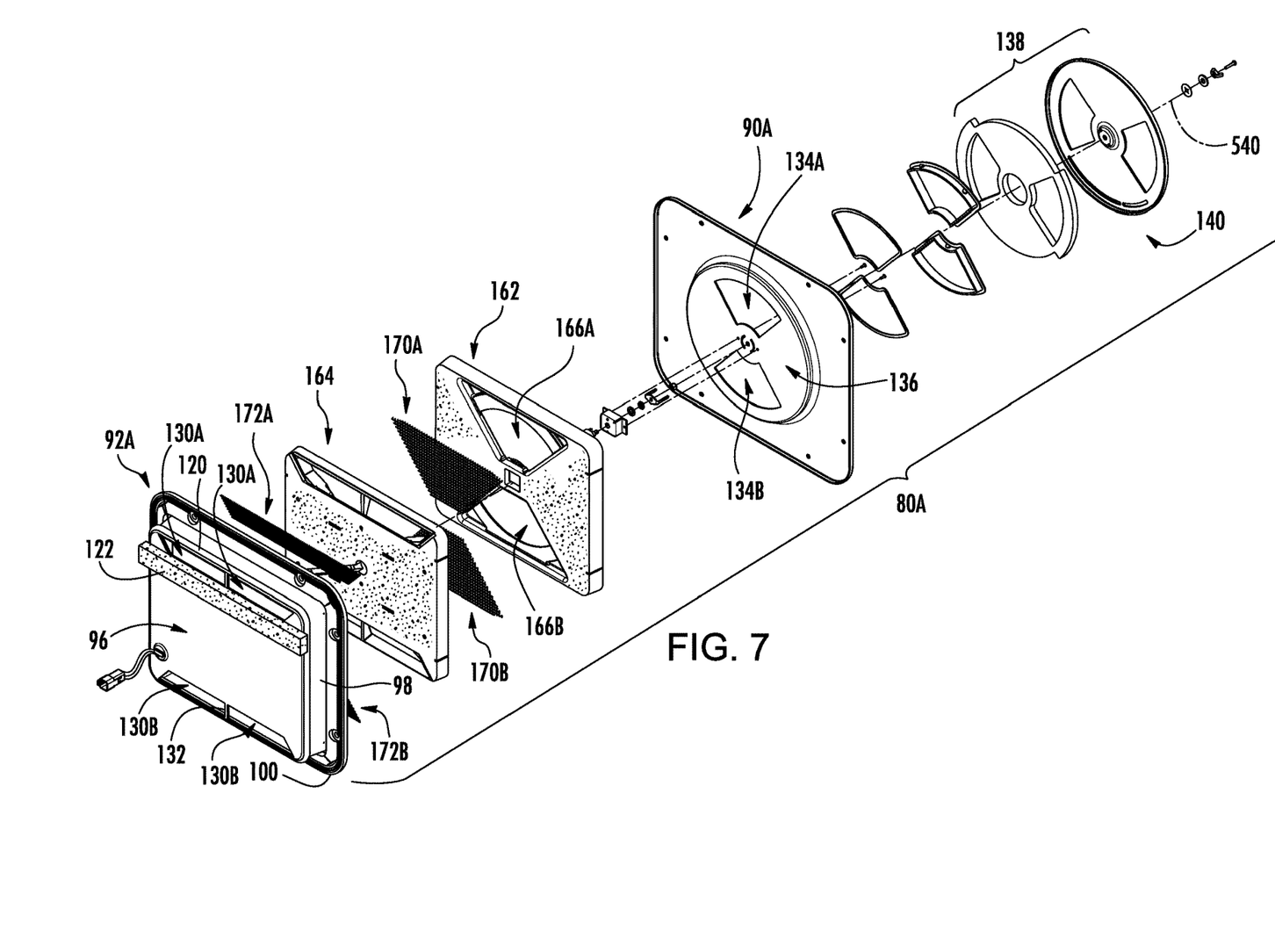
FIG. 7 is a rear exploded view of the vented access panel of FIG. 6.

FIG. 7 shows the tub 92A of the gated access panel 80A as comprising an upper port 130A and a lower port 130B along the base 96. The respective upper port and lower port are vertically bisected by a narrow reinforcing mullion or divider 132. With the access panel assembled, the ports 130A and 130B may communicate with ports 134A and 134B of the faceplate 90A. The exemplary ports 134A and 134B are formed along respective upper and lower sectors of a rearwardly protruding circular depression 136 that defines a forward recess 138 (FIG. 6). FIG. 6 further shows a rotary gate 138 as comprising a molded plastic or stamped metallic body 140 and a flat elastomeric gasket 142 secured to a rear face of the body 140 (e.g., via adhesive). The body and gasket each have a pair of ports 144A and 144B diametrically opposite each other and formed as sectors of approximately similar size to the ports 134A and 134B. Exemplary sector size is 90° or slightly less. This allows an open condition in which the ports of the gate are aligned/registered with the ports of the faceplate and a closed condition where the ports of the gate are aligned with intact portions of the faceplate circumferentially between the faceplate ports. Shifting between the open condition and the closed condition is via user-actuated (e.g., hand-actuated) rotation of the gate 138 about a central longitudinal axis 540 of the access panel 80A. FIG. 6 shows enhanced sealing of the gate 138 to the faceplate 90A, FIG. 6 further shows snap-in plastic inserts 150A and 150B complementary to the ports 134A and 134B and dimensioned to snap into and lock with the perimeter of the ports so as to protrude slightly forward and provide an enhanced seal with the gasket 42. The inserts 150A, 150B may, themselves, be sealed relative to the faceplate 134A via elastomeric gaskets 152A, 152B. FIG. 6 further shows a gate position sensor 154 which is secured to a back of the faceplate and has a shaft supporting the gate so as to provide an encoded signal representing gate orientation (and thus a degree of openness/closeness). An electronic connector 156 for the sensor 154 is also shown.

To define respective flowpaths through the upper and lower ports of the gate valve and faceplate on the one hand and the body on the other hand, the exemplary access panel 80A comprises an insert assembly 160 (FIG. 6). The insert assembly comprises a front piece 162 and a rear piece 164. The front piece 162 and the rear piece 164 are formed of an expanded polypropylene (EPP) bead material. Other forms of expanded bead polymer or foam polymer may be used. These members thus both bound flowpaths and provide insulation. An exemplary expanded bead material molding process molds the pieces from mid-density prepuff beads having internal cell pressure. The prepuff material is injected into a mold and heated (e.g., with steam). The heating relaxes the prepuff, allowing the beads to expand to form an integral object shaped by the mold. After cooling, the piece may be ejected from the mold with its shape substantially maintained.

The front piece 162 has a forward contour generally complementary to a rear contour of the faceplate with a depression/well 165 having ports 166A and 166B. A lateral perimeter of the piece 162 is complementary to the sidewall 98 to fit snugly therein.

The rear piece 164 has rear ports 168A, 168B surfaces defining a respective upper duct and lower duct segments which are positioned to define segments of respective isolated flowpaths from the ports 166A and 166B, respectively, to the ports 130A and 130B. The rear ports are split by mullions 169. Thus, two isolated/independent overall or combined flowpaths 530A and 530B (FIG. 3A) may pass through the gate valve. With the gate valve in its open condition, two respective flows are permitted along these flowpaths. A first flow provides communication between the exterior of the container and a region 534A upstream of the fan 52A. A second flow provides communication between the exterior and a region 534B downstream of the fan case. The gasket 122 seals between these two flowpaths. Similarly, the flange gasket 100 and the ring gasket 120 help isolate these flowpaths. This positioning of the access panels allows removal of the access panels to service or remove the respective fans through the openings 72A or 72B, respectively.

For purposes of description, the two overall or combined flowpaths 530A and 530B may be characterized as the sums of respective segments through the different pieces or subassemblies. Thus, each of the two inserts has surfaces bounding/defining two flowpaths (and associated passageways) through it that form respective segments of the two overall or combined flowpaths 530A and 530B (and associated passageways). In various examples, these surfaces may be formed by the expanded bead material (either as beads or as a re-melted skin formed by heating during the molding process) rather than a separately formed or applied liner.

Returning to FIGS. 6 and 7, further aspects of the use of two pieces 162 and 164 are seen. First, screens 170A and 170B may be captured between the pieces 164 and 162 along the two respective flowpaths. There may be associated perimeter reliefs on in the rear face of the forward piece 162 or forward front face of the rear piece 164 accommodating perimeters of the screens. Screens 172A, 172B may also be captured along the rear face of the rear piece 164 and sandwiched between the rear piece 164 and the front of the tub base 96 along the ports 130A and 130B. FIG. 6 further shows lateral pockets 176 in the forward face of the rear piece 164 which are closed by the rear face of the front piece 162. These pockets serve merely to reduce weight and material usage.

The un-gated access panel 80B (FIG. 8) may similarly have a two-piece insulative insert comprising a front piece 220 and a rear piece 222. The front piece 220 may be a thin flat sheet whose perimeter is shaped to closely fit in a forward portion of the sidewall 98. The rear piece 222 may have a perimeter dimensioned to be received within a rear portion of the sidewall 98. The exemplary rear piece 222 has a flat rear face and a plurality of weight-reducing recesses along the front face which are closed by the rear face of the front piece 220.

Figure 9:
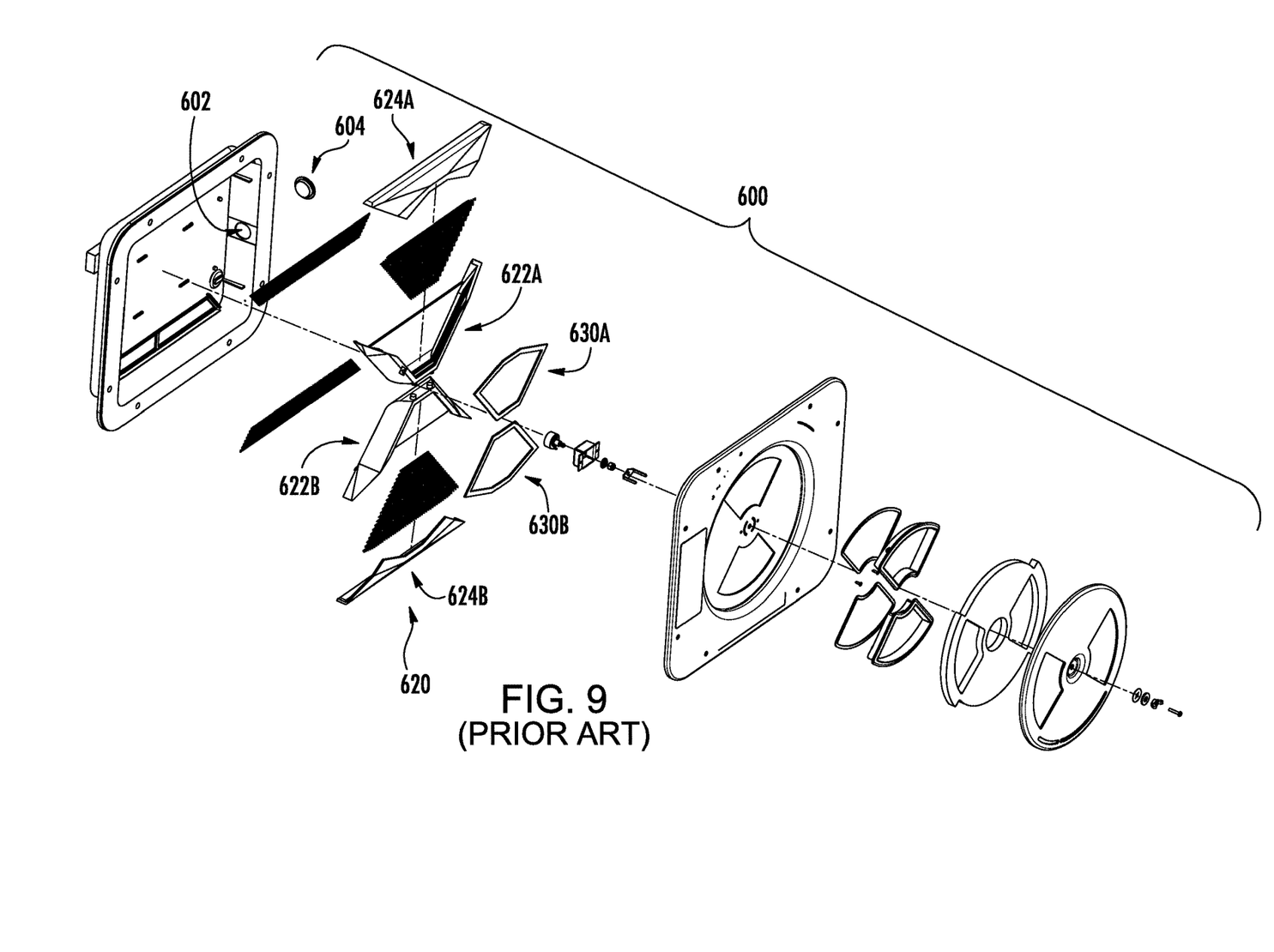
FIG. 9 is a front exploded view of a prior art vented access panel.

FIG. 9 shows a baseline prior art vented access panel 600. The faceplate and gate valve may be generally similar to those of the access panel 80A. The tub may also be similar to the tub of the access panel 80A but including an injection port 602 for injecting insulation. This may ultimately be closed via a plug 604. Exclusive of screens, a molded six-piece insert 620 defines the flowpaths from the faceplate ports through the tub ports. A main body of this may be formed by the combination of molded plastic inner members 622A and 622B and outer members 624A and 624B. Each of these defines a duct having a generally forward inlet adjacent to the associated faceplate ports and a respective upper or lower outlet adjacent the respective tub ports. The forward screens may be captured between the associated member 622A, B and 624A, B. Molded gaskets 630A and 630B may seal against the rear face of the faceplate. The assembled insert 620 is foamed around through the port 602 and prevents the foam from otherwise leaking into the desired air flowpaths. An ungated access panel (not shown) may similarly be formed by injecting foam into a covered tub member.

The use of pre-formed insulative inserts may have one or more of several advantages. If the access panels are assembled in the module's final assembly factory, Valuable curing time may be saved if the inserts are molded off-site (e.g., by a vendor). Expensive foam injection equipment and associated environmental and health/safety measures may be eliminated from the module factory. A dedicated molder of insulated material may have much greater economies of scale than the small amount of foam injection that occurs in the module factory. Also, the pre-molded insulation may take the place of other parts of the baseline access panels. For example, the baseline gate-valved access panels may have molded plastic components defining ducts through the access panel. The pre-molded inserts may, themselves, at least partially define the ducts. Thus, complexity may be reduced substantially. The two molded insulative pieces may replace the six molded pieces of the FIG. 9 prior art. The compliance of the insulative material (e.g., EPP) allows that material to seal directly against the faceplate and thus avoid need for additional internal gaskets.

Thus, one exemplary method of manufacture of the gated access panel 80A starts with the pre-molded tub 92A. The forward face of the rear wall or base 96 is pre-molded with perimeter rebates surrounding the ports 130A and 130B. After any cleaning, a bead of adhesive may be applied to the rebates circumscribing the ports. Exemplary adhesive is hot melt adhesive. The perimeter portions of the two screens 172A and 172B may be put into the respective rebates to contact the adhesive and seat in the rebates. Additional adhesive (e.g., the same hot melt adhesive) may then be applied around the rebates surrounding the screens (i.e., along intact portions of the main surface of the rear wall surrounding the rebates). The rear piece 164 may then be seated in the tub with its rear face surrounding its ports 168A, 168B contacting the adhesive surrounding the screen. This location of adhesive thus both adheres the rear piece 164 to the tub and seals the two together surrounding the associated passageways/flowpaths.

In the exemplary embodiment, the forward face of the rear piece 164 has rebates surrounding the passageway openings in order to accommodate the screens 170A and 170B. In this example, the screens 170A and 170B are then pre-seated in the rebates without adhesive. A bead of adhesive may then be applied to the front face of the rear piece 164 surrounding each of the rebates. Again, the exemplary adhesive is hot melt adhesive. The front piece 162 may then be seated against the rear piece with the latest adhesive bead both adhering the two together and sealing surrounding associated passages/flowpaths.

Adhesive may then be applied to adhere and seal the faceplate 90A to the front piece 162. In this example, to accommodate the stack thickness tolerances of components, a combination of adhesives is used. A relatively large bead of a sealant (e.g., polyurethane sealant) is applied to the front face of the well 165 surrounding the ports 166A and 166B. This will primarily serve a sealing function accommodating the stack thickness tolerances. Additionally, an additional adhesive may be used for securing. The exemplary additional adhesive is hot melt adhesive applied at the front face of the front piece 162 near the corners thereof and in the center aside a pre-molded well (if any) that ultimately receives the sensor 154. The faceplate may then be applied. For aligning the faceplate, pre-drilled holes in the faceplate may be registered with pre-drilled or pre-molded holes in the tub flange via pins. The faceplate may be held via clamping or weighting to allow adhesive cure/drying/hardening.

Thereafter, final mechanical assembly may involve placing the gaskets 152A, 152B around collars of their associated inserts 150A, 150B and snapping the inserts in place in the apertures 134A, 134B of the faceplate. The gasket 142 may be adhered to the gate body 140 (e.g., via hot melt adhesive). This gate assembly 138 may then be applied to the shaft of the sensor and then secured via fasteners. Additional details of assembly may be generally conventional.

Assembly of the ungated access panel 80B may simply involve inserting the rear piece 222 to the tub 92B then placing the front piece 220 atop the rear piece. A bead of sealant may be applied around the perimeter of the front piece between the front piece and tub flange. Additional adhesive (e.g., hot melt adhesive) may be applied near corners of the front face of the front piece and in the center for securing the plate 90B. As with the gated access panel, the faceplate may be aligned with pins through the tub flange and may be held via clamping or weighting until the adhesive has cured or dried.

Figure 10:
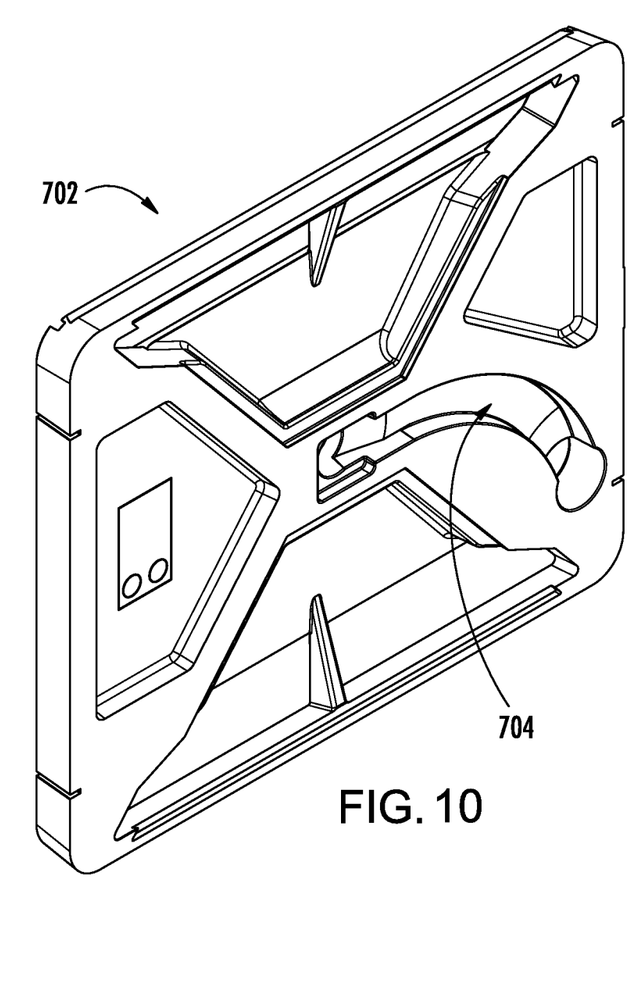
FIG. 10 is a front oblique view of an alternative rear insert piece for a gated access panel.
Figure 11:
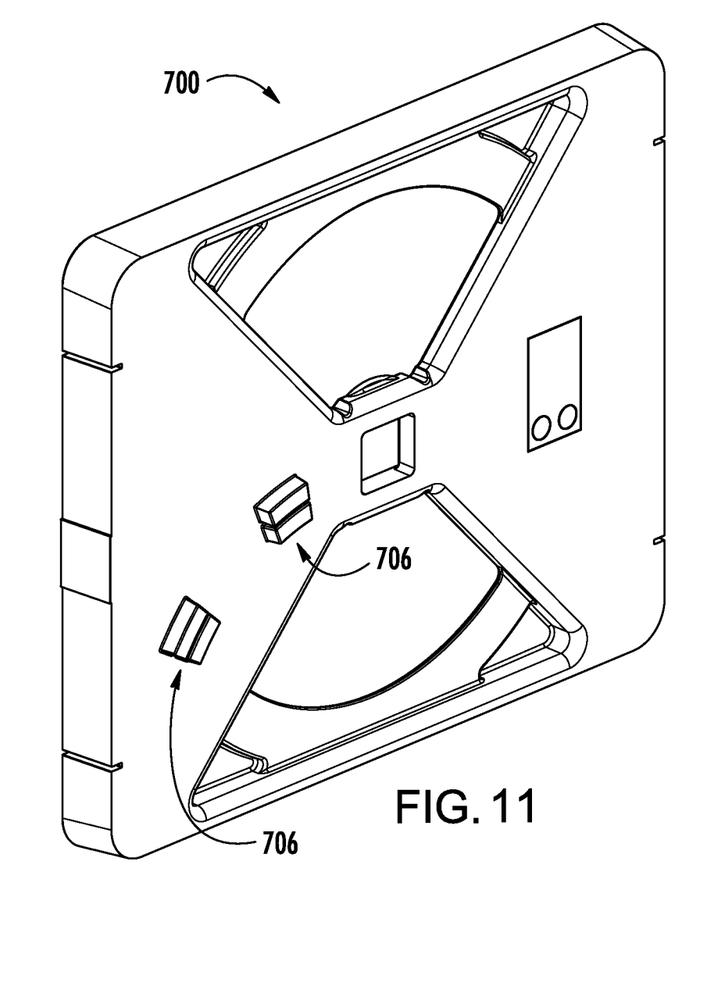
FIG. 11 is a rear oblique view of an alternative front insert piece complementary to the rear insert piece of FIG. 10.

FIGS. 10 and 11 show a slight modification wherein a passageway for passing wiring of a gate position sensor is formed along one or both of the front face of the rear piece 702 and rear face of the front piece 700. In this example, a channel 704 passes along the front face of the rear piece. Bosses 706 protrude from the rear face of the front piece to clamp the wiring in the channel.

As noted above, alternative implementations might involve pre-securing the front and rear pieces to each other prior to their insertion into the tub as a unit. Yet other implementations may involve combinations other than front and rear pieces. In one group of variations, the tub may be used to mold the expanded bead material. For example, the tub may sit in a recess in one portion of a mold and may be covered by an opposite portion of the mold. The bead material may be injected and expanded as with conventional EPP processes. However, after cooling, the tub and insert may be ejected as a unit. A cover may then be applied. In yet other variations, the cover may also be preinstalled in the mold. In other variations, the EPP piece molded in situ in the tub may merely be the first of two pieces with a second, separately molded, piece subsequently inserted/installed (e.g., along with other components).

In yet an alternative variation, there may be no pre-molded tub. The EPP member may be mounted directly to a cover piece (e.g., sheet metal as previously discussed or plastic). The EPP member or a piece thereof may be pre-molded and then adhesive bonded to the cover piece. Or the EPP member or piece could be molded to the cover. Again, in such a situation, the EPP insert may comprise one or multiple pieces and may carry additional components such as the aforementioned screens, sensor, and the like. In such a situation, it may be particularly advantageous to impart additional structural integrity to the EPP by skinning. For example, upon bead expansion, the mold may be further heated (e.g., via steam introduction) to melt a surface layer of the EPP to form a skin.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic refrigeration system (or access panel thereof), details of such existing configuration or its associated use may influence details of particular implementations. Accordingly, other embodiments are within the scope of the following claims.

What is claimed is:

1. A system forming a vent assembly for use with a transport refrigeration unit, the system comprising:
a molded tub comprising:
a base;
a sidewall extending from the base; and
a mounting flange extending from the sidewall;
a pre-molded expanded material insert within the tub; and
a cover over the insert,
wherein:
the molded tub has a first port and a second port;
the insert has a first passageway in communication with the tub first port and a second passageway in communication with the second port; and
the system further comprises a rotary gate mounted to rotate around a gate axis between:
a closed condition blocking flow through the first passageway and the second passageway; and
an open condition allowing flow through the first passageway and the second passageway,
a position sensor of the rotary gate is mounted in the pre-molded expanded material insert.

2. The system of claim 1 wherein:
the pre-molded expanded material insert is a pre-molded expanded polypropylene insert.

3. The system of claim 1 wherein the first port is an upper port and the second port is a lower port.

4. The system of claim 1 further comprising:
a gasket along a rear face of the base of the tub between the first port and the second port.

5. The system of claim 1 in combination with the transport refrigeration unit, the transport refrigeration unit further comprising:
a container body;
a compartment of the container; and
a refrigeration system comprising:
a compressor;
a first heat exchanger;
an expansion device;
a second heat exchanger;
a refrigerant flowpath proceeding sequentially through the compressor, first heat exchanger, expansion device, and second heat exchanger to return to the first heat exchanger; and
a fan positioned to drive an airflow along an air flowpath from the compartment, across the second heat exchanger and returning to the compartment.

6. The combination of claim 5 wherein:
the container is an intermodal container; and
the refrigeration system is mounted at a first end of the container.

7. The combination of claim 6 wherein:
the refrigeration system is a removeable module.

8. The system of claim 1 wherein:
the pre-molded expanded material insert comprises expanded bead material.

9. The system of claim 8 wherein:
the expanded bead material is expanded polypropylene.

10. A method for manufacturing the system of claim 1, the method comprising:
inserting the pre-molded expanded material insert to the tub; and
securing the cover over the insert.

11. The method of claim 10 further comprising:
securing a rotary gate to the cover.

12. The method of claim 10 wherein the inserting comprises:
first inserting the pre-molded expanded material insert; and
second inserting a second pre-molded expanded material insert.

13. The method of claim 12 wherein a combination of the insert and the second insert further comprises:
a first passageway through the insert and second insert;
a second passageway through the insert and second insert;
a first screen along the first passageway; and
a second screen along the second passageway.

14. The method of claim 12 further comprising:
securing the insert to the second insert after the inserting of the insert.

15. The system of claim 1 further comprising:
a second pre-molded expanded material insert.

16. The system of claim 15 wherein:
the cover is located directly over the second pre-molded expanded material insert; and
the second pre-molded expanded polypropylene insert is located directly over the pre-molded expanded material insert.

17. A vent assembly for use with a transport refrigeration unit, the vent assembly comprising:
a molded tub comprising:
a base;
a sidewall extending from the base;
a first port and a second port; and
a mounting flange extending from the sidewall;
a first pre-molded expanded material insert within the tub and having a first passageway in communication with the tub first port and a second passageway in communication with the second port;
a second pre-molded expanded material insert in the tub and having a first passageway in communication with the tub first port so that a first combined passageway passes sequentially through the second insert, first insert, and tub and a second passageway in communication with the second port so that a second combined passageway passes sequentially through the second insert, first insert, and tub;
a cover over the first pre-molded expanded material insert and second pre-molded expanded material insert; and
a rotary gate mounted to rotate around a gate axis between:
a closed condition blocking flow through the first combined passageway and the second combined passageway; and
an open condition allowing flow through the first combined passageway and the second combined passageway.

18. The vent assembly of claim 17 further comprising:
a first screen sandwiched between the first insert and the second insert along the first combined passageway; and
a second screen sandwiched between the first insert and the second insert along the second combined passageway.

19. The vent assembly of claim 17 wherein:
expanded material surfaces of the first insert and second insert form surfaces of the first combined passageway; and
expanded material surfaces of the first insert and second insert form surfaces of the second combined passageway.

20. A system for use with a transport refrigeration unit, the system comprising:
  a molded tub comprising:
    a base;
    a sidewall extending from the base; and
    a mounting flange extending from the sidewall;
  a pre-molded expanded material insert within the tub;
  a second pre-molded expanded material insert; and
  a cover,
wherein:
  the cover is located directly over the second pre-molded expanded material insert; and
  the second pre-molded expanded material insert is located directly over the pre-molded expanded insert.

* * * * *